United States Patent [19]
MacPherson et al.

[11] Patent Number: 5,837,761
[45] Date of Patent: Nov. 17, 1998

[54] PIGMENTED PLASTICS COMPOSITIONS

[75] Inventors: Ian Alexander MacPherson, Renfrewshire; Iain Frank Fraser, Kilbirnie; Alison MacLennan, Renfrewshire, all of Scotland

[73] Assignee: Ciba Specialty Chemicals Corporation, Tarrytown, N.Y.

[21] Appl. No.: 723,729

[22] Filed: Sep. 30, 1996

[30] Foreign Application Priority Data

Oct. 7, 1995 [GB] United Kingdom ................. 9520493

[51] Int. Cl.$^6$ .......................... C08K 5/23; C07C 245/00
[52] U.S. Cl. ................. 524/190; 534/575; 534/576; 534/720; 534/874; 562/73; 568/938; 106/241; 106/496
[58] Field of Search .............. 524/190; 534/575, 534/576, 720, 874; 562/73; 568/938; 106/241, 496

[56] References Cited

U.S. PATENT DOCUMENTS

| | | | |
|---|---|---|---|
| 2,225,665 | 12/1940 | Siegel | 260/40 |
| 2,694,055 | 11/1954 | Ludwig et al. | 260/151 |
| 2,821,525 | 1/1958 | Waitkins et al. | 260/151 |
| 4,083,687 | 4/1978 | Pugin et al. | 8/42 |
| 4,115,377 | 9/1978 | Putney | 260/151 |
| 4,248,635 | 2/1981 | Henning et al. | 106/22 |
| 4,719,292 | 1/1988 | Schui et al. | 534/575 |

FOREIGN PATENT DOCUMENTS

| | | |
|---|---|---|
| 0097913 | 1/1984 | European Pat. Off. |
| 2316276 | 4/1977 | France . |
| 2432538 | 2/1980 | France . |

OTHER PUBLICATIONS

Chemical Abstracts, vol. 115, 282066t, 1991.
Chemical Abstracts, vol. 61, abst. No. 5816h and Kogyo Kagaku Zasshi, 1964, vol. 67 (1), pp. 163–165.
Chem. Abst. vol. 66, No. 22, 96276F, (1967).
Chem. Abst. vol. 67, No. 9, 44834n, (1967).

*Primary Examiner*—Kriellion S. Morgan
*Attorney, Agent, or Firm*—Kevin T. Mansfield

[57] ABSTRACT

A plastics composition comprising a high molecular weight material and an effective coloring amount of an azo pigment of formula

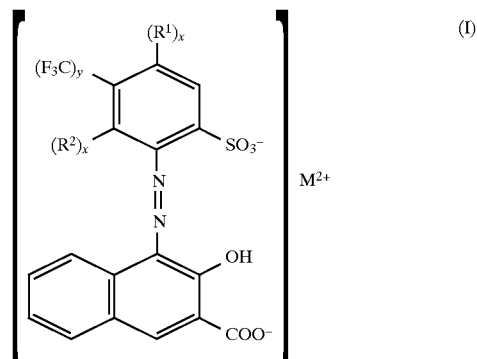

where M is Mg, Ca, Sr, Ba or Mn or a mixture of two or more thereof, $R^1$ and $R^2$ are chlorine or methyl, x is zero or 1, y is zero or 1 and the sum of x and y is 1, with the proviso that when the high molecular weight material is polyvinyl chloride y is zero.

20 Claims, No Drawings

PIGMENTED PLASTICS COMPOSITIONS

This invention relates to pigmented plastics compositions, new azo pigments suitable for use in such compositions and their production.

It has been found that certain azo pigments have very good high temperature stability when used to pigment plastics.

Accordingly, in one aspect, the present invention provides a plastics composition comprising a high molecular weight material and an azo pigment of formula

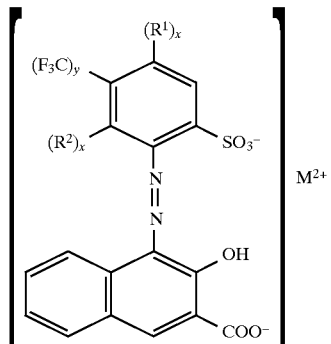

where M is Mg, Ca, Sr, Ba or Mn or a mixture of two or more thereof, $R^1$ and $R^2$ are chlorine or methyl, x is zero or 1, y is zero or 1 and the sum of x and y is 1 with the proviso that when the high molecular weight material is polyvinyl chloride y is zero.

In especially preferred compositions of the invention, the pigment is of formula I where M is Ca, x is 1 and y is zero or of formula I where M is Ca, y is 1 and x is zero.

The pigments of formula (I) where $R^1$ and $R^2$ are each methyl, x is 1 and y is zero are believed to be novel. Also believed to be novel is a pigment of formula (I) where M is Ca, x is zero and y is 1 in an orange crystalline form which exhibits an x-ray diffraction pattern having six prominent x-ray diffraction lines corresponding to "d" spacings of 18.60, 5.21, 4.20, 4.01, 3.90 and $3.66 \times 10^{-10}$ meter. Further believed to be novel is a pigment of formula (I) where M is Ca, x is zero and y is 1 in a red crystalline form which exhibits an x-ray diffraction pattern having six prominent x-ray diffraction lines corresponding to "d" spacings of 21.38, 13.31, 6.60, 5.35, 4.20 and $3.35 \times 10^{-10}$ meter.

The pigments of formula (I) may be prepared by laking, with a magnesium, calcium, strontium, barium or maganese salt or a mixture of two or more of such salts, an azo dyestuff obtainable by coupling a diazonium salt of an amine of formula

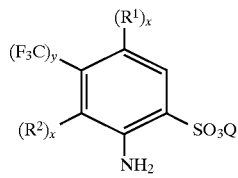

where Q is hydrogen, an alkali metal or ammonium and x and y are as hereinbefore defined, with beta-hydroxynaphthoic acid (BONA).

Examples of salts which can be used to effect laking are the chlorides, sulphates, nitrates, formates and acetates of magnesium, calcium, strontium, barium and manganese and mixtures of two or more thereof. These laking metal salts may be added to the preformed azo dyestuff, i.e. after the coupling reaction, or they may be included in the coupling reaction mixture, prior to coupling, together with the beta-hydroxynaphthoic acid coupling component or, more usually, together with the diazonium salt.

The coupling and laking reactions may be carried out using known procedures. In carrying out the coupling reaction, a solution or suspension of the diazonium salt may be added to a solution or suspension of the coupling component, or the coupling component solution or suspension may be added to the diazonium salt solution or suspension, or both diazonium salt solution or suspension and coupling component solution or suspension may be added simultaneously to water, to an aqueous buffer or to an aqueous solution of the metal salt used to effect laking. The pH of the coupling reaction mixture is preferably maintained at from 9 to 12.

In the preparation of a pigment of formula I where M is Ca, x is zero and y is 1, when the coupling reaction is carried out by adding a solution or suspension of the diazonium salt to a solution or suspension of the coupling component, the pigment obtained on laking the resulting dyestuff with a calcium salt is in the orange crystalline form hereinbefore described, whereas when the coupling reaction is carried out by adding the diazonium salt solution or suspension and the coupling component solution or suspension simultaneously to water, an aqueous buffer, or an aqueous solution of a laking calcium salt, the pigment obtained on laking is in the red crystalline form hereinbefore described.

Conventional additives for pigments can be included in the coupling reaction mixture or added to the azo dyestuff prior to or after laking. Such conventional additives include one or more surfactants to assist in the formation of discrete particles and to improve the properties of the finished product and one or more resins such as those conventionally used to form a resinated pigment and thereby improve dispersibility of the pigment, a typical resin of this type being a rosin, e.g. a disproportionated rosin.

The pigment of the invention may be isolated by filtration from the reaction mixture when coupling and laking are completed. The filtered product can be washed with water to remove soluble salts. The pigment may be dried and powdered by sieving, ball-milling, grinding or other known methods.

In preferred embodiments, the high molecular weight material is a thermoplastic resin, which may be a polyolefin such as polyethylene, polypropylene or polyisobutylene, polytetrafluoroethylene, a vinyl polymer such as polyvinyl chloride or polyvinyl acetate, polystyrene, an acrylic polymer such as PMMA, a styrene-butadiene copolymer, a styrene-acrylonitrile copolymer, an acrylonitrile - butadiene-styrene copolymer, a polyester such as polyethylene terephthalate or polybutylene terephthalate, a polyamide, a polyimide, a polycarbonate, a polyphenylene oxide, a polyether-ether ketone (PEEK) resin, a polyphenylene sulphide or a polyether sulphone. In especially preferred embodiments, the high molecular weight material is a polyolefin, especially high density polyethylene.

Pigmenting of the high molecular weight material may be carried out by mixing a pigment of the invention, if desired in the form of a master batch, into the substrate material using a roll mill or other mixing or grinding apparatus. The pigmented material may then be brought into its desired form by known processes such as calendering, extrusion, spinning, compression moulding, casting or injection moulding to produce shaped plastic articles such as films, sheets, fibres or other, particularly 3-dimensional, shaped articles.

The pigmented high molecular weight material generally contains from 0.001 to 30 parts, preferably 0.1 to 5 parts, by weight of the pigment per 100 parts by weight of the material to be pigmented, although this amount may be varied depending on the depth of colour desired.

In order to obtain different colour shades, one or more fillers or other colouring components, e.g. white pigments, coloured pigments or black pigments, may be included in the high molecular material composition in addition to a pigment of the invention.

The invention is illustrated by the following Examples, in which parts are by weight.

Example 1

To a dispersion of 4,6-dichloroaniline-2-sulphonic acid (12.1 g) in water (80 ml) is added 47% aqueous sodium hydroxide solution (4.4 g). The mixture is heated at 55° C. and stirred until a complete solution is obtained. The solution is cooled to 0° C. by the addition of ice. A solution of sodium nitrite (3.5 g) in water (50 ml) is added followed by 36% aqueous hydrochloric acid (9.4 ml). The diazotised slurry obtained is stirred for 30 minutes while the temperature is maintained below 5° C.

2-Hydroxy-3-naphthoic acid (9.4 g) is dissolved at 40° C. in water (200 ml) and 47% aqueous sodium hydroxide (5.3 g). The solution is cooled to 5° C. by the addition of ice. The diazotised slurry is then added, with stirring, over 18 minutes. The pH is maintained at 10.4–10.6 during the coupling by the simultaneous addition of dilute aqueous sodium hydroxide.

A solution of calcium chloride (8.7 g) in water (50 ml) is added to the suspension obtained and stirring is continued for 40 minutes, while maintaining a temperature of 8°–10° C. The slurry is then heated to 95° C. and held at this temperature for 60 minutes. The pH of the slurry is raised to 8.5 using dilute aqueous sodium hydroxide and a solution of Burez 9/18-a maleic modified disproportionated rosin-(2.3 g) in water (80 ml) and 47% aqueous sodium hydroxide (0.7 g) at 70° C. is added. The pH of the resulting pigment slurry is adjusted to 7.2 by the addition of dilute hydrochloric acid and the temperature reduced to 70° C. by the addition of ice. The slurry is then filtered and the presscake obtained is washed with water, dried at 70° C. and roasted at 90° C. The resulting dried lumps are osterised to give a powdered pigment composition.

Example 2

To a dispersion of 2-amino-4-(trifluoromethyl) benzenesulphonic acid (12.1 g) in water (80 ml) is added 47% aqueous sodium hydroxide solution (4.4 g). The mixture is heated at 55° C. and stirred until a complete solution is obtained. The solution is cooled to 0° C. by the addition of ice. A solution of sodium nitrite (3.5 g) in water (50 ml) is added followed by 36% aqueous hydrochloric acid (9.4 ml). The diazotised slurry obtained is stirred for 30 minutes while the temperature is maintained <5° C. 2-Hydroxy-3-naphthoic acid (9.6 g) is dissolved at 40° C. in water (200 ml) and 47% aqueous sodium hydroxide (5.3 g). The solution is cooled to 5° C. by the addition of ice. The diazotised slurry is then added, with stirring, over 16 minutes. The pH is maintained at 10.4–10.6 during the coupling by the simultaneous addition of dilute aqueous sodium hydroxide. A solution of calcium chloride (8.7 g) in water (50 ml) is added to the suspension obtained and stirring is continued for 25 minutes, while maintaining a temperature of 8°–10° C. The slurry is then heated to 95° C. and held at this temperature for 60 minutes. The pH of the slurry is raised to 8.5 using dilute aqueous sodium hydroxide and a solution of Burez 9/18 (2.2 g) in water (80 ml) and 47% aqueous sodium hydroxide (0.7 g) at 70° C. is added. The pH of the resulting pigment slurry is adjusted to 7.2 by the addition of dilute hydrochloric acid and the temperature reduced to 70° C. by the addition of ice. The slurry is then filtered and the presscake obtained is washed with water, dried at 70° C. and roasted at 90° C. The resulting dried lumps are osterised to give a powdered pigment composition.

The powder x-ray diffraction pattern of the resulting orange resinated pigment, and that of the orange pigment obtained by analogous procedure but omitting the rosin, has six prominent x-ray diffraction lines corresponding to "d" spacings of 18.60, 5.21, 4.20, 4.01, 3.90 and $3.66 \times 10^{-10}$ meter.

Example 3

High density polyethylene (100 parts) is mixed with the pigment of Example 1 (0.132 part) and titanium dioxide (1 part). The mixture is milled on a two-roll mill and then injection moulded. The resulting moulding is stable to heat at 260° C. for a dwell time of 5 minutes before a colour change occurs compared with a standard moulding heated for 12 seconds at 200° C.

Example 4

Example 3 is repeated, using the pigment of Example 2 (0.5 part) in place of the pigment of Example 1. The resulting moulding is stable to heat at 260° C. for a dwell time of 5 minutes before a colour change occurs compared with a standard moulding heated for 12 seconds at 200° C.

Example 5

To a dispersion of 4,6-dimethylaniline-2-sulphonic acid (10.0 g) in water (150 ml) is added 47% aqueous sodium hydroxide solution (5.1 g). The mixture is heated to 55° C. and stirred until a complete solution is obtained. The solution is cooled to 0° C. by the addition of ice. A solution of sodium nitrite (3.5 g) in water (25 ml) is added followed by 36% aqueous hydrochloric acid (9.7 ml). The diazotised slurry obtained is stirred for 70 minutes while the temperature is maintained below 5° C. Just prior to coupling, solid calcium chloride (8.5 g) is added.

2-Hydroxy-3-naphthoic acid (9.6 g) is dissolved at 40° C. in water (200 ml) and 47% aqueous sodium hydroxide (5.1 g). To this solution is added a solution of Portuguese WW Rosin—an abietyl type resin—(4.2 g), water (60 ml) and 47% aqueous sodium hydroxide (1.4 g). The resulting solution is cooled to 6° C. by the addition of ice. The diazotised slurry is then added, with stirring, over 60 minutes. The pH is maintained at 10.4–10.6 during the coupling by the simultaneous addition of dilute aqueous sodium hydroxide. Stirring is continued for 60 minutes. The slurry is then heated to 90° C. and the pH adjusted to 7.2 by the addition of dilute hydrochloric acid. The temperature is then reduced to 70° C. by the addition of ice. The slurry is then filtered and the presscake obtained is washed with water, dried at 70° C. and roasted at 90° C. The resulting dried lumps are osterised to give a powdered pigment composition.

Example 6

Example 3 is repeated, using the pigment of Example 5 (0.1 part) in place of the pigment of Example 1. The resulting moulding is stable to heat to 280° C. for a dwell time of 5 minutes before a colour change occurs compared with a standard moulding heated for 12 seconds at 200° C.

Example 7

To a dispersion of 2-amino-4-(trifluoromethyl) benzenesulphonic acid (24.1 g) in water (250 ml) is added 47% aqueous sodium hydroxide solution (10.0 g). The mixture is heated at 45° C. and stirred until a complete solution is obtained. 36% aqueous hydrochloric acid (22.9 g) is then added. The solution is cooled to 0° C. by the addition of ice and a solution of sodium nitrite (6.9 g) in water (25 ml) is added. The diazotised slurry obtained is stirred for 30 minutes while the temperature is maintained <5° C. Just prior to coupling, a solution of calcium chloride (18.4 g) in water (100 ml) is added. 2-Hydroxy-3-naphthoic acid (18.8 g) is dissolved at 35° C. in water (250 ml) and 47% aqueous sodium hydroxide (10.0 g). To this solution is added a solution of Portuguese WW Rosin—an abietyl type resin— (4.3 g), water (60 ml) and 47% aqueous sodium hydroxide (1.4 g). The resulting solution is cooled to 5° C. by the addition of ice. The diazotised slurry and 2-hydroxy-3-naphthoic acid/resin solution are then added simultaneously (over 55 minutes) to a vessel containing water (100 ml) at 5° C., with stirring. The pH is maintained at 10.4–10.6 during the coupling by the simultaneous addition of dilute aqueous sodium hydroxide. The temperature is maintained below 5° C. by periodic addition of ice. Stirring is continued for 30 minutes. The slurry is then heated to 90° C. and the pH adjusted to 7.2 by the addition of dilute hydrochloric acid. The temperature is then reduced to 70° C. by the addition of ice. The slurry is then filtered and the presscake obtained is washed with water, dried at 70° C. and roasted at 90° C. The resulting dried lumps are osterised to give powdered pigment composition.

The powder x-ray diffraction pattern of the resulting resinated red pigment, and that of the red pigment obtained by an analogous procedure but omitting the resin, has six prominent x-ray diffraction lines corresponding to "d" spacings of 21.38, 13.31, 6.60, 5.35, 4.20 and 3.35×10$^{-10}$ meter.

Example 8

Example 3 is repeated, using the pigment of Example 7 (0.1 part) in place of the pigment of Example 1. The resulting moulding is stable to heat at 280° C. for a dwell time of 5 minutes before a colour change occurs compared with a standard moulding heated for 12 seconds at 200° C.

What is claimed is:

1. A plastics composition comprising a high molecular weight material having incorporated therein an effective colouring amount of an azo pigment of formula

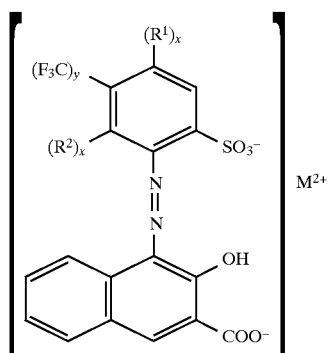

where M is Mg, Ca, Sr, Ba or Mn or a mixture of two or more thereof, $R^1$ and $R^2$ are chlorine or methyl, x is zero or 1, y is zero or 1 and the sum of x and y is 1, with the proviso that when the high molecular weight material is polyvinyl chloride y is zero.

2. A composition according to claim 1, in which M is Ca, x is 1 and y is zero.

3. A composition according to claim 2, in which $R^1$ and $R^2$ are each chlorine or $R^1$ and $R^2$ are each methyl.

4. A composition according to claim 1, in which M is Ca, y is 1 and x is zero.

5. A composition according to claim 1, in which the pigment is in resinated form.

6. A composition according to claim 1, in which the high molecular weight material is a thermoplastic resin.

7. A composition according to claim 2, in which the high molecular weight material is a thermoplastic resin.

8. A composition according to claim 4, in which the high molecular weight material is a thermoplastic resin.

9. A composition according to claim 6, in which the thermoplastic resin is a polyolefin.

10. A composition according to claim 9, in which the thermoplastic resin is high density polyethylene.

11. An azo pigment which is of the formula (I) as specified in claim 1 where $R^1$ and $R^2$ are each methyl, x is 1 and y is zero.

12. A pigment as defined in claim 11 which is in resinated form.

13. An azo pigment which is of the formula (I) as specified in claim 1 where M is Ca, x is zero and y is 1 in a crystalline form which exhibits an X-ray diffraction pattern having six prominent X-ray diffraction lines corresponding to "d" spacings of 18.60, 5.21, 4.20, 4.01, 3.90 and 3.66×10$^{-10}$ meter.

14. A pigment as defined in claim 13 which is in resinated form.

15. An azo pigment which is of the formula (I) as specified in claim 1 where M is Ca, x is zero and y is 1 in a crystalline form which exhibits an X-ray diffraction pattern having six prominent X-ray diffraction lines corresponding to "d" spacings of 21.38, 13.31, 6.60, 5.35, 4.20 and 3.35×10$^{-10}$ meter.

16. A pigment as defined in claim 15 which is in resinated form.

17. A process for the preparation of a pigment as defined in claim 11 which comprises laking, with a magnesium, calcium, strontium, barium or manganese salt or a mixture of two or more thereof, an azo dyestuff obtainable by coupling a diazonium salt of an amine of formula

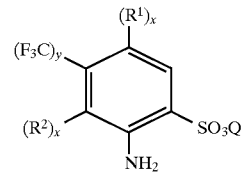

where Q is hydrogen, an alkali metal or ammonium, $R^1$ and $R^2$ are each methyl, x is 1 and y is zero, with beta-hydroxynaphthoic acid.

18. A process according to claim 17, in which the salt is a chloride, sulphate, nitrate, formate or acetate of magnesium, calcium, strontium, barium or manganese or a mixture of two or more thereof.

19. A process for the preparation of a pigment as defined in claim 13 which comprises coupling a diazonium salt of an amine of formula

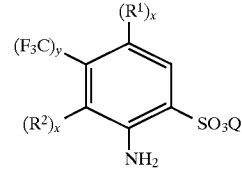

where Q is hydrogen, an alkali metal or ammonium, $R^1$ and $R^2$ are each methyl, x is zero and y is 1, with beta-hydroxynaphthoic acid by adding a solution or suspension of the diazonium salt to a solution or suspension of the coupling component, and laking the resulting dyestuff with a calcium salt.

20. A process for the preparation of a pigment as defined in claim 15 which comprises coupling a diazonium salt of an amine of formula

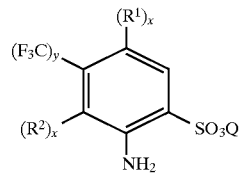

where Q is hydrogen, an alkali metal or ammonium, $R^1$ and $R^2$ are each methyl, x is zero and y is 1, with beta-hydroxynaphthoic acid by adding a solution or suspension of the diazonium salt and a solution or suspension of the coupling component simultaneously to water, an aqueous buffer or an aqueous solution of a laking calcium salt, and, where the diazonium salt solution or suspension and coupling agent solution or suspension are added simultaneously to water or an aqueous buffer, laking the resulting dyestuff with a calcium salt.

* * * * *